(12) United States Patent
McKellar et al.

(10) Patent No.: US 10,906,047 B2
(45) Date of Patent: Feb. 2, 2021

(54) HELICAL-BLADED CUTTING REEL

(71) Applicant: Eteros Technologies Inc., Surrey (CA)

(72) Inventors: Aaron McKellar, Maple Ridge (CA); Erik Ingram, Abbotsford (CA); Joe Heywood, New Westminster (CA); Rudi Klossok, Coquitlam (CA); James Ellison, Kelowna (CA)

(73) Assignee: Eteros Technologies Inc., Surrey (CA)

( * ) Notice: Subject to any disclaimer, the term of this patent is extended or adjusted under 35 U.S.C. 154(b) by 190 days.

(21) Appl. No.: 15/804,416

(22) Filed: Nov. 6, 2017

(65) Prior Publication Data
US 2019/0126284 A1    May 2, 2019

Related U.S. Application Data

(63) Continuation-in-part of application No. 15/796,157, filed on Oct. 27, 2017.

(51) Int. Cl.
*A01G 3/00* (2006.01)
*B02C 18/18* (2006.01)
(Continued)

(52) U.S. Cl.
CPC .......... *B02C 18/186* (2013.01); *A01D 34/53* (2013.01); *A01D 2101/00* (2013.01); *A01G 3/00* (2013.01)

(58) Field of Classification Search
CPC ........ A01D 34/53; A01D 34/42; A01D 34/43; A01D 34/435; A01D 2101/00;
(Continued)

(56) References Cited

U.S. PATENT DOCUMENTS 2,063,067 A * 12/1936 Waller .................. A01D 34/53
                                                        56/252
3,073,100 A    1/1963 Kingsley
(Continued)

FOREIGN PATENT DOCUMENTS

CA    2775457 A1    11/2012
CA    3012787 A1    9/2017
(Continued)

OTHER PUBLICATIONS

High-Carbon Steels, Maine Welding Company, http://mewelding.com/high-carbon-steels/, Feb. 20, 2016 per archive.org (Year: 2016).*
(Continued)

*Primary Examiner* — Robert E Pezzuto
(74) *Attorney, Agent, or Firm* — Schwegman Lundberg & Woessner, P.A.

(57) ABSTRACT

A helical-bladed cutting reel includes a central shaft having a central axis of rotation, and a plurality of helical blades. Each of the blades extends along a respective helical path on an outer surface of the central shaft. A direction of each respective helical path has both an axial component and a circumferential component relative to the central axis of the central shaft as it extends across the outer surface of the central shaft. Each of the helical blades is welded directly to the central shaft. In preferred embodiments all of the blades are continuously autogenously welded directly to the central shaft.

19 Claims, 7 Drawing Sheets

(51) Int. Cl.
*A01D 34/53* (2006.01)
*A01D 101/00* (2006.01)

(58) Field of Classification Search
CPC ...... A01D 34/475; A01D 34/62; A01D 34/54; A01D 34/56; A01D 75/30; B02C 18/186; A01G 3/00
USPC .......... 56/7, 249, 294; 241/33, 55, 222, 289, 241/293; 460/100–105
See application file for complete search history.

(56) References Cited

U.S. PATENT DOCUMENTS

| | | | | |
|---|---|---|---|---|
| 3,233,395 | A | * | 2/1966 | Dahl ................... A01D 57/30 56/192 |
| 5,027,592 | A | * | 7/1991 | Wieneke ............... A01D 34/52 56/249 |
| 8,757,524 | B2 | | 6/2014 | Mosman |
| 9,161,566 | B2 | | 10/2015 | Hall |
| 9,636,838 | B2 | | 5/2017 | Evans et al. |
| 10,415,740 | B2 | | 9/2019 | Evans et al. |
| 2008/0081681 | A1 | * | 4/2008 | Vogt ....................... A01F 12/16 460/105 |
| 2013/0175372 | A1 | | 7/2013 | Mosman |
| 2014/0087794 | A1 | | 3/2014 | Hall |
| 2014/0196587 | A1 | | 7/2014 | Beyerlein et al. |
| 2015/0285427 | A1 | | 10/2015 | Evans et al. |
| 2015/0290827 | A1 | | 10/2015 | Evans et al. |
| 2017/0164557 | A1 | | 6/2017 | Harold et al. |
| 2019/0070741 | A1 | | 3/2019 | Ingram |
| 2019/0124851 | A1 | | 5/2019 | Ingram et al. |
| 2019/0224687 | A1 | | 7/2019 | Ingram |

FOREIGN PATENT DOCUMENTS

| | | | |
|---|---|---|---|
| FR | 1116686 | A | 5/1956 |
| GB | 790483 | A | 2/1958 |
| GB | 2494206 | A | 3/2013 |
| JP | 2016175117 | A * | 10/2016 |
| WO | WO-2014183209 | | 11/2014 |
| WO | WO-2017161435 | | 9/2017 |
| WO | WO-2018009999 | A1 | 1/2018 |

OTHER PUBLICATIONS

Salt Bath Nitriding, IBC coating technologies inc, http://www.ibccoatings.com/salt-bath-nitriding-ferritic-nitrocarburizing-dhn-dhfnc, Jun. 28, 2015 per archive.org (Year: 2015).*
Mig Spot-Welding, esabna.com, https://www.esabna.com/euweb/mig_handbook/592mig11_1.htm, Oct. 12, 2016 (Year: 2016).*
NPL Machine Translation, Espacnet.com, JP 2016175117 A Description (Year: 2016).*
Paxair, TIG Welding, Jul. 31, 2013, https://www.praxairdirect.com/Industrial-Gas-and-Welding-Information-Center/Welding-Tips-Tricks-and-Inforrnation/TIG-Welding.html (Year: 2013).*
Dr. Scott Smith, Balancing Rotating Elements in Machines, Apr. 1, 2014, https://www.ctemag.com/news/articles/balancing-rotating-elements-machines (Year: 2014).*
"International Application No. PCT/CA2018/000200, International Search Report and Written Opinion dated Jan. 15, 2019", (Jan. 15, 2019), 7 pgs.
"International Application No. PCT/CA2018/000201, International Search Report and Written Opinion dated Jan. 17, 2019", (Jan. 17, 2019), 9 pgs.
"Spiral Blades Forming and Welding Machine", Ruigong Machinery Co., Ltd., as downloaded on Nov. 24, 2017 from http://www.tube-pipe-machines.com/product/spiral-blades-forming-welding-machine.html, (Aug. 7, 2016), 4 pgs.
"Spirals", Heusch GmbH, as downloaded on Nov. 24, 2017 from http://www.heusch.de/spirals, (Jan. 14, 2017), 5 pgs.
"Twister Systems", Keirton, Inc., as downloaded on Nov. 24, 2017 from https://www.twistertrimmer.com/twister-systems, (May 4, 2017), 7 pgs.
"U.S. Appl. No. 15/796,157, Non Final Office Action dated Mar. 24, 2020", 8 pgs.
"U.S. Appl. No. 15/796,157, Notice of Allowance dated Jul. 20, 2020", 7 pgs.
"U.S. Appl. No. 15/796,157, Response filed May 29, 2020 to Non Final Office Action dated Mar. 24, 2020", 8 pgs.

* cited by examiner

FIG. 7

HELICAL-BLADED CUTTING REEL

CROSS-REFERENCE TO RELATED APPLICATIONS

This application is a continuation-in-part of U.S. patent application Ser. No. 15/796,157, filed on Oct. 27, 2017, which is hereby incorporated herein by reference.

FIELD OF THE INVENTION

The present application relates to helical-bladed cutting reels, such as those used in plant trimming or cutting machines and mowers, for example.

BACKGROUND OF THE INVENTION

Helical-bladed cutting reels are used in a number of different applications, such as reel mowers for lawns or crops, and plant trimming machines such as those used for hops or medical marijuana, for example.

Cutting reels typically rotate at relatively high rotational rates, such as hundreds or thousands of revolutions per minute, for example. Consequently, one important design consideration for cutting reels is the need to achieve sufficiently uniform rotational balance of the resulting reel, to minimize the likelihood that undesirable reel wobble may result from a rotationally asymmetrical distribution of mass in the rotating reel. Rotational balance is especially important for cutting reels that spin at higher speeds, such as trimming machines for example, to avoid undue mechanical stresses caused by centrifugal forces resulting from rapidly rotating unbalanced mass on one side of the reel.

In conventional cutting reels, elongated helical blades are typically welded to a plurality of annular discs or hubs that are mounted to and extend radially outward from a central rotating shaft, at spaced-apart distances along the axial length of the shaft.

Alternatively, rather than employing such hubs to mount the blades, another conventional cutting reel design has its elongated helical blades press-fit directly into complementary-shaped slots milled into the central shaft.

As yet another alternative, it has been suggested that the elongated blades could somehow be formed integrally with the shaft.

All of the above types of conventional reels tend to be expensive to manufacture, because conventional manufacturing processes are labor-intensive.

For example, in the fabrication of a conventional hubbed reel, the central shaft and hubs must first be fabricated, then the annular hubs must be attached to the shaft. Before the blades can be attached to the hubs of the reel, the fabricator must first use a machine to manually bend a length of linear rectangular blade stock into a helical shape to form each blade. Each blade must then be manually spot-welded to all of the hubs, typically by Metal-Inert Gas (MIG) welding using a consumable wire electrode as a metal filler material. Each reel typically requires multiple helical blades, such as six blades for example, and so these laborious bending and welding processes must be repeated for each blade. The fabrication of a conventional hubbed reel can easily require an hour of manual labor, depending upon the specific type and purpose of the reel in question.

Likewise, the alternative type of reel mentioned above, in which the helical blades are press-fit into complementary-shaped slots milled into the central shaft, are also expensive to manufacture for similar reasons. As with hubbed reels, before the blades can be attached to the reel, there is a separate required step of first bending the blades into helical shape using a machine, before the shaft is even prepared. A plurality of helical slots must then be precisely milled into the shaft, with a very low manufacturing tolerance to ensure a sufficiently tight press-fit to securely attach the blade to the shaft for often-demanding applications. Each blade must then be carefully press-fit into its respective milled slot. Again, such reels can easily require an hour of manual labor to fabricate, depending upon their intended application.

Similarly, it would be difficult and labor-intensive to attempt to integrally form the shaft and helical blades with each other, and indeed may require inventive ingenuity to accomplish. A new fabrication method would have to be found for the integrated shaft and blades, because the non-cylindrical protruding blades would preclude the conventional use of a lathe to form the shaft. The shape of the integrally formed reel would be complex and would have to be formed with precise, low manufacturing tolerances to achieve an adequate rotational balancing of the resulting reel.

Thus, conventional helical-bladed reels tend to suffer from high fabrication costs due to their labor-intensive conventional manufacturing processes.

SUMMARY OF THE INVENTION

The present inventors have conceived of improvements in both the structure of helical-bladed reels and their method of manufacture. In doing so, the inventors have been motivated by considerations that are believed not to have been known to the notional person of ordinary skill in the art prior to the filing date of the present application. In this regard, one of the innovations disclosed in the above-cited U.S. Ser. No. 15/796,157 includes replacing the single cutting reel of a conventional plant trimming machine with multiple cutting reels per tumbler, such as two or three cutting reels, which in conjunction with a specific positional placement of one of the multiple reels, results in qualitative synergistic improvements in trimming throughput and quality. That innovative idea, however, has created a special motivation, believed to have been known only to the present applicant and inventors prior to the filing date of the present application, to reduce both the size and the manufacturing cost of cutting reels, to thereby allow more cutting reels per tumbler without unduly increasing the cost of the resulting plant trimming machine.

In one illustrative embodiment, a helical-bladed reel includes a central shaft having a central axis of rotation, and a plurality of helical blades. Each of the blades extends along a respective helical path on an outer surface of the central shaft, wherein a direction of each respective helical path has both an axial component and a circumferential component relative to the central axis of the central shaft as it extends across the outer surface of the central shaft. Each of the helical blades is welded directly to the central shaft.

Such an embodiment of a cutting reel, with its blades welded directly to its shaft, runs contrary to what the inventors perceive as a bias in the conventional wisdom in the art of cutting reels regarding the undesirability of welding the blades directly to the shaft. The inventors believe this bias was based on an assumption that a single blade would be welded at a time, in accordance with conventional fabrication practices, because such welding would cause differential heating along the helical path of the blade being welded, which would tend to warp the shaft, thereby rendering it unsuitable for typical rotating-reel applications. This undesirable differential heating and resulting warpage would be particularly severe in the case of continuous welding and would tend to affect the entire length of the shaft, but may also arise to a lesser extent in the case of spot welding at discrete locations along the shaft. The present inventors have conceived that such difficulties can be overcome, however, by replacing the conventional fabrication process with a novel process, disclosed herein, in which all of the helical blades are simultaneously welded onto the shaft, while simultaneously being formed into their helical shapes. The simultaneous welding of all of the blades onto the shaft, in the manner disclosed below, results in symmetrical heating at a plurality of evenly distributed angular positions around the circumference of the shaft, thus significantly reducing the likelihood of undesirable warpage of the shaft, in contrast to the above-noted differential heating that occurs in conventional processes as each blade is welded to the shaft in succession. Thus, by replacing conventional fabrication techniques with novel techniques disclosed herein, the present inventors have enabled the reel to have a simpler design than was previously thought possible, by employing blades that are directly welded to the central shaft without warping the shaft.

In illustrative embodiments, each of the helical blades is continuously welded directly to the central shaft. Advantageously, a continuous weld tends to provide a stronger bond than spot welding. Such embodiments of a cutting reel would not have been possible to construct using conventional reel fabrication techniques in which the blades are attached to the reel sequentially rather than simultaneously, because the large amount of heat energy delivered to the shaft along the helical path for continuously welding the single blade to the shaft would tend to deform and warp the shaft too severely for adequately balanced rotation.

In illustrative embodiments, each of the helical blades is autogenously welded directly to the central shaft. For example, the autogenous welding may include Tungsten-Inert-Gas (TIG) welding. Advantageously, the autogenous welding, which melts contacting portions of the blade and shaft together without using any filler material, results in a physically different and stronger joint than the welding techniques involving filler materials which are typically employed in conventional reel fabrication techniques. In preferred embodiments each of the helical blades is both continuously and autogenously welded directly to the central shaft.

The reel may have a rotationally balanced mass distribution including a plurality of welds symmetrically distributed about the central axis of the central shaft, the plurality of welds having been formed by simultaneous welding of all of the plurality of blades directly to the central shaft.

Each of the welds may extend continuously along a respective one of the helical paths on the outer surface of the central shaft. In the same or other illustrative embodiments, each of the welds may include a region in which material of the central shaft has been autogenously melted together with material of one of the helical blades.

The helical-bladed reel may further include an anti-dive mechanism configured to engage with a flexible cutting knife to prevent the knife from diving into a path of a leading edge of each of the blades as the reel spins. For example, the anti-dive mechanism may include a disc extending radially outward from the central shaft at a leading end of the shaft at which each of the plurality of helical blades first engages with the flexible cutting knife as the reel spins.

The plurality of helical blades may include between two and fifteen helical blades. For example, the plurality of helical blades may include six helical blades.

Each of the respective helical paths may extend for at least one revolution about the central axis of the central shaft over the axial length of the central shaft. For example, each of the respective helical paths may extend for at least one and one-half revolutions about the central axis of the central shaft over the axial length of the central shaft.

In some embodiments, each of the helical blades may include high-carbon steel. In the same or other embodiments, the central shaft and the plurality of helical blades may be nitrided.

In some embodiments, a radially outer surface region of each of the helical blades may include a leading outer surface and a trailing outer surface. The leading outer surface may be normal to a radius of the central shaft, and the trailing outer surface may incline $2\times10^1$ (twenty) degrees radially inward relative to the leading outer surface as it extends away from the leading outer surface.

In alternative embodiments, each of the helical blades may be spot-welded directly to the central shaft.

In alternative embodiments, each of the helical blades may be welded directly to the central shaft using a filler material.

In some alternative embodiments, each of the welds may include a region of the outer surface of the central shaft in which material of the central shaft has been welded with a filler material.

In some alternative embodiments, the plurality of welds may include a plurality of groups of welds, each group corresponding to a respective one of the plurality of blades. Each group of welds may include a plurality of discrete welds at spaced apart intervals along a corresponding one of the helical paths on the outer surface of the shaft, each discrete weld having been formed by spot-welding the respective blade to the shaft. In such embodiments, each one of the welds is symmetrically distributed with corresponding welds of the other groups at the same axial position along a length of the central shaft.

In a related innovative method described herein, a method of fabricating a helical-bladed reel includes advancing a central shaft through a shaft aperture defined through a fabrication die, while simultaneously advancing a plurality of blade stock lengths through respective blade channels defined through the fabrication die. The blade channels are angled to cause the blade stock lengths to advance along a desired helical path as they advance through the die. As the blade stock lengths and the shaft advance through the die, the method involves simultaneously welding all of the blade stock lengths to the shaft. In some embodiments, welding may include compressing the blade stock lengths against the shaft while continuously autogenously welding the blade stock lengths to the shaft.

Other aspects, features and advantages of illustrative embodiments of the present invention will become apparent to those ordinarily skilled in the art upon review of the following description of such embodiments in conjunction with the accompanying figures.

BRIEF DESCRIPTION OF THE DRAWINGS

In drawings which illustrate embodiments of the invention.

DETAILED DESCRIPTION

Figure 1:
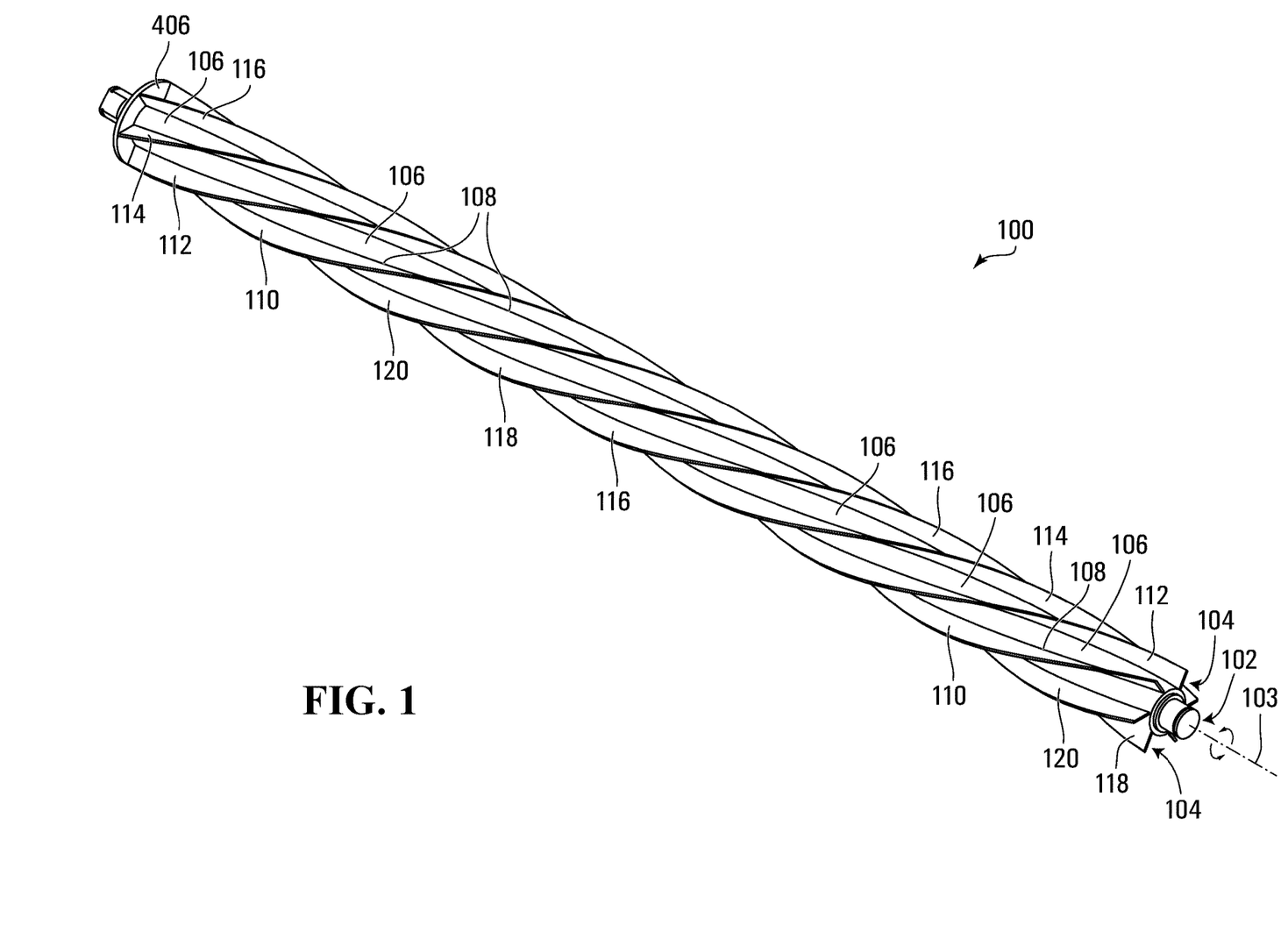
FIG. 1 is a right-top-front isometric view of a helical-bladed reel according to a first embodiment of the invention.

Referring to FIGS. 1-4, a helical-bladed cutting reel according to a first embodiment of the invention is shown generally at 100 in FIG. 1. In this embodiment, the helical-bladed cutting reel 100 includes a central shaft 102 having a central axis 103 of rotation, and a plurality of helical blades shown generally at 104. Each of the plurality of helical blades 104 extends along a respective helical path on an outer surface 106 of the central shaft 102: for example, FIG. 1 shows a first helical path 108 of a first helical blade 110 of the plurality of helical blades 104, and corresponding respective spaced apart helical paths along the outer surface 106 for the other helical blades 104. A direction of each respective helical path, such as the first helical path 108, has both an axial component and a circumferential component relative to the central axis 103 of the central shaft 102 as the path extends across the outer surface 106 of the central shaft 102. In this embodiment, each of the plurality of helical blades 104 is welded directly to the central shaft 102.

More particularly, in this embodiment each of the helical blades 104 is continuously welded directly to the central shaft 102. Also in this embodiment, each of the helical blades 104 is autogenously welded directly to the central shaft. Thus, in the present embodiment each of the helical blades 104 is continuously autogenously welded directly to the central shaft 102 along its entire length. In contrast to conventional reel fabrication processes that typically employ welding techniques using filler materials, the autogenous welding joint of the present embodiment has been formed by melting and merging together contacting portions of each helical blade 104 and of the outer surface 106 of the shaft 102 without using filler material, resulting in a physically different and stronger joint than those that could be achieved using welding with filler material. More particularly, as discussed in greater detail below, in this embodiment each of the plurality of helical blades 104 has been autogenously welded to the outer surface 106 of the shaft 102 by autogenously TIG-welding contacting surfaces of the blade 104 and the outer surface 106 together, as described below in connection with fabrication of the cutting reel 100.

In illustrative embodiments, the plurality of helical blades 104 may include between two and fifteen helical blades. Typically, larger-diameter reels are capable of accommodating a larger number of blades than smaller-diameter reels. In the present embodiment, the plurality of helical blades 104 includes at least six helical blades. More particularly, in this embodiment the plurality of helical blades 104 consists of exactly six helical blades, namely, the first helical blade 110, a second helical blade 112, a third helical blade 114, a fourth helical blade 116, a fifth helical blade 118 and a sixth helical blade 120. Alternatively, a larger or a smaller number of helical blades may be substituted in other embodiments. Generally, in cutting reel embodiments, the effectiveness of the reel depends not only on the number of blades and their rotation rate but also on how tightly wound each blade is, as measured by how many revolutions each blade makes about the central axis 103 over the axial length of the reel.

In the present embodiment, each blade's respective helical path extends for at least one revolution about the central axis 103 of the central shaft 102 over the axial length of the central shaft. More particularly, in this embodiment each of the respective helical paths along the outer surface 106 extends for at least one and one-half revolutions about the central axis 103 over the axial length of the shaft 102. More particularly still, in this embodiment each respective helical path of each one of the plurality of helical blades 104, such as the first helical path 108 of the first helical blade 110 for example, extends for exactly one and one-half revolutions (540 degrees) about the central axis 103 over the axial length of the shaft 102. Thus, due to its 1.5 revolutions about the axis 103, the first helical path and the first helical blade 110 can be seen at both the left and right end regions of the cutting reel 100 simultaneously, as shown in the frontal views of FIGS. 1 and 4. Effectively, therefore, the six helical blades of the present embodiment simultaneously present nine cutting surfaces to a complementary cutting knife (not shown) against which the blades bear as the cutting reel 100 rotates about the axis 103. Alternatively, in other embodiments the helical path of each of the helical blades 104 may revolve more or less than 1.5 revolutions about the central axis 103, for more or less tightly spiralling blade patterns, as desired. In this regard, the illustrative innovative fabrication method described below is more amenable to tightly spiralling blades than conventional techniques, which are typically limited to no more than about three-quarters of a revolution over a typical reel's axial length.

Figure 3:
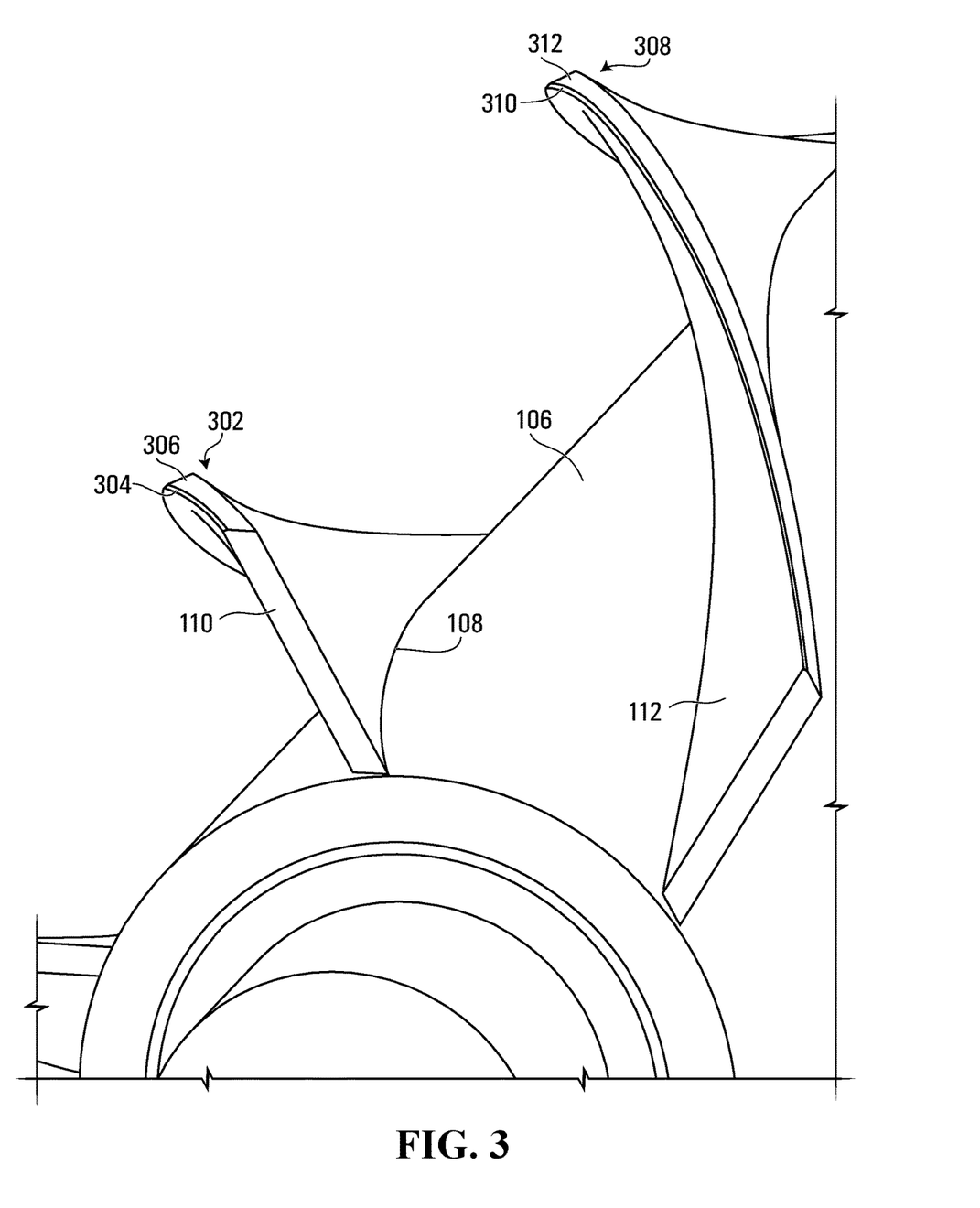
FIG. 3 is an inclined right-rear-top detail view of a right (trailing) end of the helical-bladed reel of FIG. 1 and FIG. 2.

Referring to FIG. 3, in this embodiment a radially outer surface region of each of the helical blades 104 includes a leading outer surface and a trailing outer surface, wherein the trailing outer surface is inclined relative to the leading outer surface. For example, in this embodiment the first helical blade 110 has a radially outer surface region 302 including a leading outer surface 304 and a trailing outer surface 306, the second helical blade 112 has a radially outer surface region 308 including a leading outer surface 310 and a trailing outer surface 312, and likewise the third, fourth, fifth and sixth helical blades have identical radially outer surface regions, each with a leading outer surface and a trailing outer surface. In this embodiment all of the helical blades 104 are identical to each other, and therefore only the first helical blade 110 is described in greater detail.

In this embodiment, the leading outer surface 304 is normal to a radius of the central shaft 102, as are the leading outer surfaces of the other helical blades 104. More particularly, in this embodiment the leading outer surface 304 technically lies on the surface of a virtual cylinder centered about the central axis 103 of the shaft 102, but the tangential length of the leading outer surface 304 is a sufficiently small fraction of the circumference of the virtual cylinder that the leading outer surface 304 has an approximately planar shape, with its plane being normal (perpendicular) to a virtual line extending radially outward from the central axis 103 of the shaft 102.

In this embodiment, the trailing outer surface 306 inclines radially inward as it extends away from the leading outer surface 304. More particularly, in this embodiment the trailing outer surface 306 inclines $2 \times 10^1$ (twenty) degrees radially inward relative to the leading outer surface 304 as it extends away from the leading outer surface 304. More particularly still, in this embodiment the twenty-degree inclination of the trailing outer surface 306 relative to the leading outer surface 304 results from a combination of a sixty-degree angle between the trailing outer surface 306 and the sidewalls of the first helical blade 110 that extend outwardly from the shaft 102, and a ten-degree angle between the sidewalls of the blade 110 and a radially outward virtual line extending from the shaft 102. In this embodiment, since all cutting is effectively accomplished by the leading outer surface 304 bearing against the knife, there is no need for the trailing outer surface 306 to maintain contact with the knife, and therefore, the radially inward incline of the trailing outer surface 306 avoids unnecessary friction and wear between the knife and the trailing outer surface.

Figure 4:
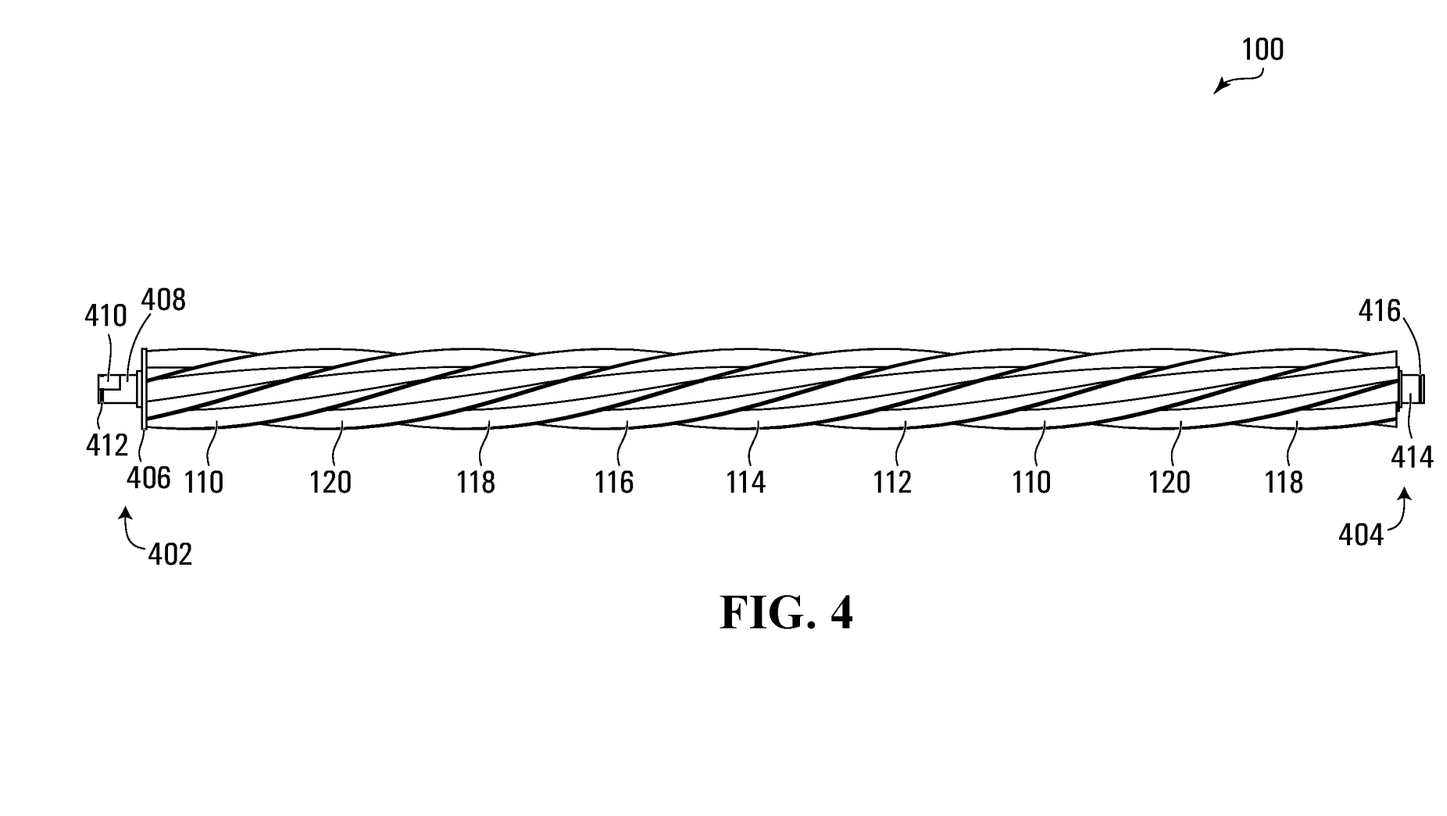
FIG. 4 is a front elevation view of the helical-bladed reel of FIG. 1.

Referring to FIGS. 1 and 4, in this embodiment the central shaft 102 has a left end region shown generally at 402 and a right end region shown generally at 404. In this embodiment, the cutting reel 100 includes an anti-dive mechanism 406 configured to engage with a flexible cutting knife (not shown) to prevent the knife from diving into a path of a leading edge of each of the blades as the reel spins. More particularly, in this embodiment the anti-dive mechanism 406 includes a disc extending radially outward from the central shaft 102 at a leading end of the shaft 102 at which each of the plurality of helical blades 104 first engages with the flexible cutting knife as the reel spins. In this embodiment the leading end of the shaft 102 is the left end region 402 of the shaft 102.

The flexible cutting knife may include a flexible knife as disclosed in either commonly owned co-pending U.S. patent application Ser. No. 15/476,412 filed on Mar. 31, 2017, or commonly owned co-pending U.S. patent application Ser. No. 15/796,157 filed on Oct. 27, 2017, both of which are hereby incorporated herein by reference, for example. In this embodiment, the helical blades 104 are oriented such that the left end region 402 is the leading end of the helical-bladed cutting reel 100, meaning the end at which each of the helical blades 104 first makes contact with the cutting knife as the reel spins, with the point of contact between the blade and the cutting knife then moving from the left end region 402 toward the right end region 404 as the reel spins. The anti-dive mechanism 406 prevents the flexible cutting knife from diving down into the path of the helical blades 104 at the left end region 402 where the blades first engage with the surface of the cutting knife, which is the only region where it might otherwise have been possible for the knife to dive down into and block the path of the helical blades 104. Once each blade is successfully engaged with the flexible cutting knife at the left end region 402, the point of contact between the blade and the knife will successfully propagate toward the right end region 404 as the cutting reel 100 spins, and no further anti-dive mechanisms are required along the length of the cutting reel 100. Alternatively, the anti-dive mechanism 406 may be omitted in other embodiments, such as embodiments that employ rigid rather than flexible cutting knives, or in other embodiments the anti-dive mechanism may be incorporated into the flexible knife itself as disclosed in the above-cited U.S. Ser. No. 15/796,157, for example.

In this embodiment, at the left end region 402, the central shaft 102 further includes a bearing mount region 408 for mounting a radial ball bearing (not shown) to the shaft 102, and a drive region 410 having a generally D-shaped cross-section for mounting a drive gear or pulley (not shown) rotationally locked with the shaft 102 for driving the rotation of the cutting reel 100 about the axis 103. In this embodiment the shaft 102 further includes a retaining groove 412 for receiving a clamp or other retaining ring (not shown) to secure the radial ball bearing and drive gear or pulley to the shaft 102. Similarly, in this embodiment, at the right end region 404, the shaft 102 includes a bearing mount region 414 for mounting a radial ball bearing (not shown) to the shaft, and a retaining groove 416 for retaining the bearing to the shaft 102. For operation of the cutting reel 100, radial ball bearings secured to the bearing mount regions 408 and 414 are typically used to secure the cutting reel 100 to a frame or housing, to allow free rotation of the cutting reel 100 relative to the frame or housing. In this embodiment, moving axially inward from the bearing mount regions 408 and 414, the shaft 402 has two step-wise diameter increases, the first forming an end disc at each end having a short axial length, and the second step-wise diameter increase forming the outer surface 106 to which the helical blades 104 are welded and along which the helical paths extend.

Figure 2:
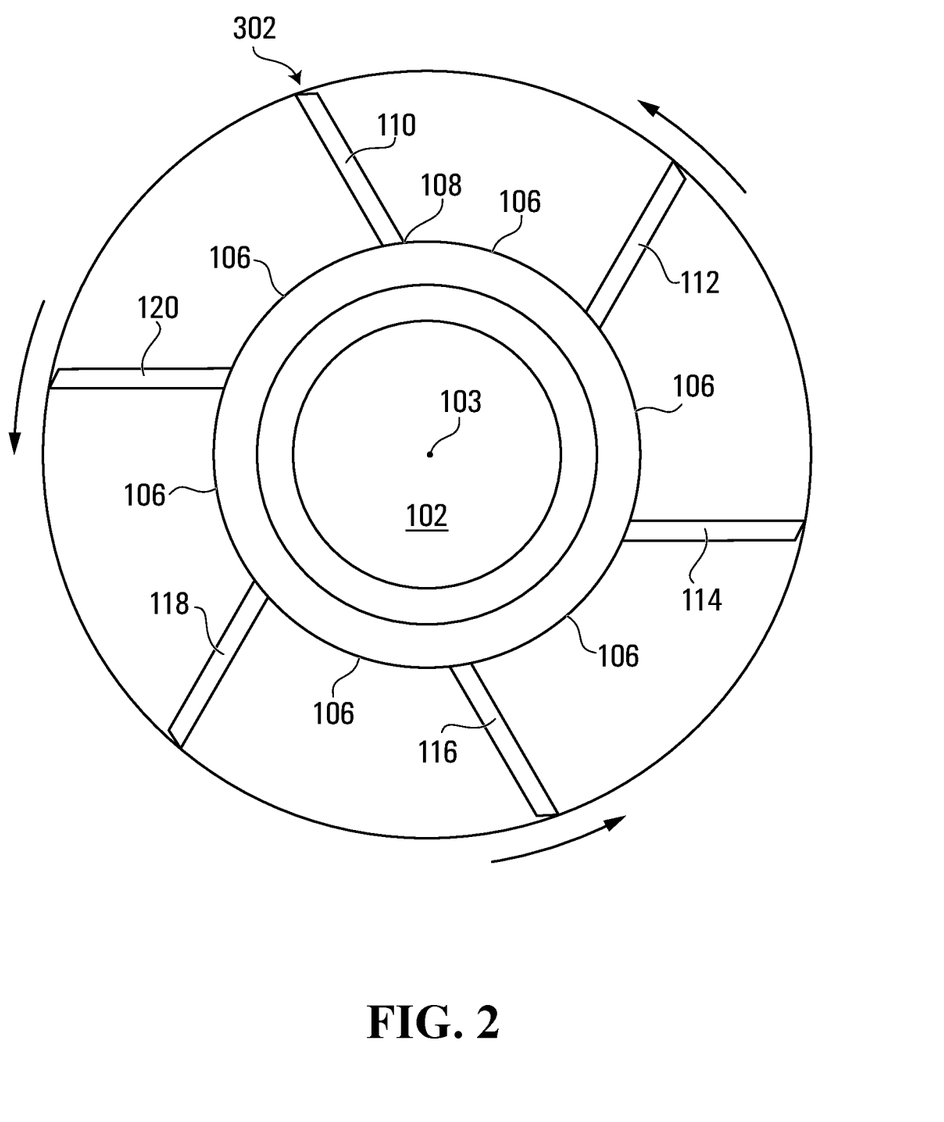
FIG. 2 is a right-side elevation view of the helical-bladed reel of FIG. 1.
Figure 5:
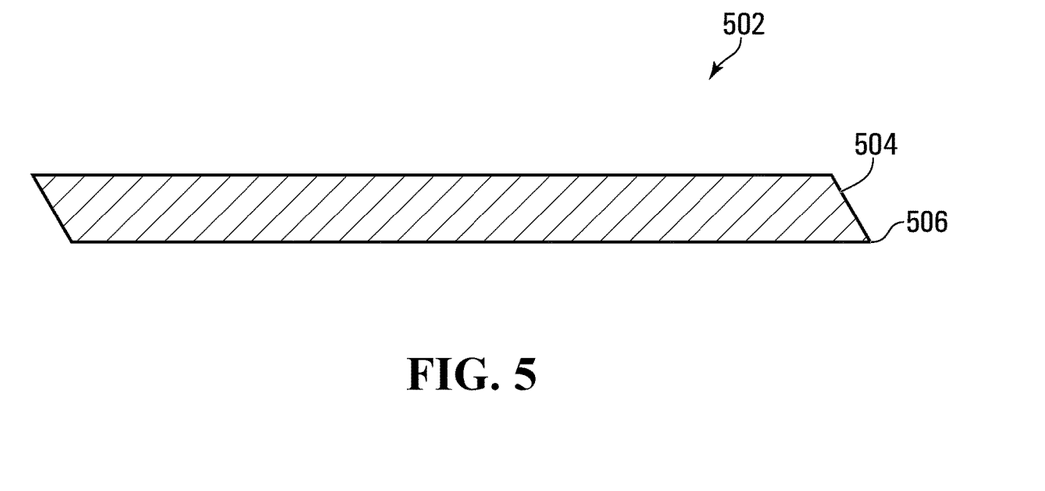
FIG. 5 is a cross-section of blade stock material used to make each of the helical blades of the reel of FIG. 1, before being welded to the central shaft and before its radially outer surface region is altered to define separate inclined leading and trailing outer surfaces.

Referring to FIGS. 2, 3 and 5, an illustrative innovative method of fabricating the helical-bladed cutting reel 100 is described. Generally, the innovative method involves advancing a central shaft through a shaft aperture defined through a fabrication die, while simultaneously advancing a plurality of blade stock lengths through respective blade channels defined through the fabrication die. The blade channels are angled to cause the blade stock lengths to advance along a desired helical path as they advance through the die. As the blade stock lengths and the shaft advance through the die, the method involves simultaneously welding all of the blade stock lengths to the shaft. This general method is described in greater detail below.

In this embodiment, the shaft 102 itself may be fabricated by conventional methods, such as lathing for example. In this embodiment, the shaft 102 is composed of standard steel or mild steel, having a relatively low carbon content. Alternatively, other suitable metals may be substituted.

Referring to FIGS. 3 and 5, in this embodiment the helical blades 104 are formed from blade stock material having a parallelogram-shaped cross section instead of the rectangular cross-section used in conventional fabrication techniques. More particularly, the blade stock material used in the present embodiment is shown generally at 502 in FIG. 5. In this embodiment, at each opposing end, the blade stock material 502 has internal angles of $6 \times 10^1$ (sixty) degrees and $1.2 \times 10^2$ (one hundred and twenty) degrees at each opposing side. In this regard, the angles of the blade stock material 502 are selected to correspond to the desired inclination of the trailing outer surface 306, thereby advantageously avoiding the need to separately machine and manually form the trailing outer surface 306. More particularly, in this embodiment the sixty-degree angle formed at each acute corner of the blade stock material 502, when considered in conjunction with a ten-degree inclination of the entire helical blade 104 when attached to the shaft 102, results in a twenty-degree radially inward inclination of the trailing outer surface 306 relative to the leading outer surface 304.

In this embodiment, the blade stock material 502 is composed of high carbon steel, and thus the helical blades 104 of the present embodiment include high carbon steel. Alternatively, other suitable metals may be substituted. In this embodiment, the blade stock material 502 is first cut into six identical lengths corresponding to the six helical blades 104. Each of the cut lengths of blade stock is sufficiently long to extend from the left end region 402 to the right end region 404 of the cutting reel 100 once it has been formed into its helical shape to form one of the helical blades 104. In this embodiment, each such cut length of blade stock is straight, linear and elongated, and has the cross-sectional shape of the blade stock material 502 shown in FIG. 5.

In contrast to a typical conventional fabrication process, in which each such length of blade stock would have to first be manually shaped into a helical-shaped blade before attaching the blade to the cutting reel in a separate subsequent attachment step, in the present embodiment all six of the lengths of blade stock are attached to the shaft 102 and formed into their helical shapes simultaneously, in a single step.

To achieve this, in the present embodiment the ends of the shaft 102 and of the six lengths of blade stock are inserted into a fabrication die (not shown). In this embodiment, the fabrication die is generally disc-shaped, and has a central shaft channel at its center for feeding the central shaft 102 therethrough. In this embodiment, the fabrication die also has a plurality of blade channels disposed in alternating fashion with a plurality of welding torches, disposed in an alternating circumferential arrangement around the central shaft channel, for forming the blade stock lengths into their desired helical shapes while simultaneously welding them to the shaft 102.

Referring to FIGS. 2, 3 and 5, in this embodiment the plurality of blade channels of the fabrication die includes six blade channels, one for each of the six helical blades 104 that are to be formed. The six blade channels are disposed at equal angular intervals about the shaft 102. In this embodiment each of the blade channels is both radially angled relative to a radial line from the central axis 103, and axially angled relative to the axis 103 itself, as discussed below.

Regarding the radial angling of each blade, in this embodiment each of the blade channels of the fabrication die is angled relative to a radial line extending from the axis 103, so that within any given cross-section of the cutting reel 100 that is normal to its axis, the radially distal end of the blade at its radially outer surface region 302 and the central axis 103 of the shaft 102 are not co-linear with the radially proximal end of the blade where it meets the outer surface 106 of the shaft. More particularly, as best seen in FIG. 2, in this embodiment the first helical blade 110 is inclined by about $1 \times 10^1$ (ten) degrees in the direction of rotation of the cutting reel 100 (counter-clockwise as seen in FIG. 2), so that the radially outer surface region 302 of the first helical blade 110 leads by ten degrees ahead of the radially proximal end of the blade 110 at which the blade 110 is attached to the central shaft 102 along the first helical path 108, as the cutting reel 100 spins.

Regarding the axial angling of the blade channels, in this embodiment each of the blade channels is angled away from the axial direction of the shaft 102, so that each length of blade stock extends through the fabrication die in a direction that has both an axial component parallel to the axis 103 and a circumferential component rotating about the axis 103. More particularly, in this embodiment each of the blade channels directs the blade stock at an angle equivalent to the angle formed between the first helical path 108 and a virtual axial line running over the outer surface 106 of the shaft 102, to cause each of the six lengths of blade stock material 502 to define a helical path having the same shape as the first helical path 108 as it is forced through its corresponding blade channel in the fabrication die. It will be recalled that in this embodiment, the first helical path 108 and the other five desired helical paths of the other five blades each complete 1.5 rotations (540 degrees) around the central axis 103 as they traverse the length of the shaft 102 from the left end region 402 to the right end region 404 thereof.

In this embodiment, the fabrication die further includes a plurality of clamps configured to apply a radially inward force to the lengths of blade stock as they are forced through the fabrication die. More particularly, in this embodiment the fabrication die includes six pneumatic clamps, each configured to force a corresponding blade stock length radially inward against the central shaft 102 as the blade stock passes axially through its respective blade channel in the die. Alternatively, other suitable means for forcing the blade stock against the shaft may be substituted.

As noted above, in this embodiment the plurality of blade channels are arranged in alternating fashion with a plurality of welding torches. More particularly, in this embodiment the plurality of welding torches includes six Tungsten-Inert-Gas (TIG) welding torches, each configured to generate a high temperature plasma arc to autogenously weld each length of blade stock to the central shaft 102. In this embodiment, a first one of the TIG-welding torches is positioned so that the shortest arc path from its tungsten tip leads to a position on the outer surface 106 immediately adjacent the first helical path 108 for the first helical blade 110, and likewise the remaining five TIG-welding torches are positioned so that the shortest arc paths from their respective tips lead to positions on the outer surface 106 immediately adjacent the desired helical paths of the other helical blades 104.

This configuration delivers somewhat more heat energy to the shaft 102 than to the blade stock material 502, but the shaft 102 has a greater volumetric heat capacity than the blade stock material 502 owing to its larger mass, and thus this configuration tends to ideally balance the amounts of heat energy delivered to the outer surface 106 of the shaft 102 and to the blade stock material 502 to achieve autogenous welding of the blade stock material and the shaft.

Thus, to shape the lengths of blade stock material 502 into their desired shapes while simultaneously attaching the blades to the shaft 102, in this embodiment the ends of the six lengths of blade stock material 502 and of the shaft 102 are first inserted into the fabrication die, following which the six blades 104 are simultaneously welded directly to the shaft 102. In the present embodiment, the welding includes compressing the blade stock lengths against the shaft while continuously autogenously welding the blade stock lengths to the shaft. To achieve this, in this embodiment the clamps of the fabrication die (which in this embodiment are pneumatic) are activated to apply a radially inward force to the lengths of blade stock material 502, to press the blade stock material radially inward against the central shaft 102 as the blade stock material and shaft are advanced through the die. In this embodiment, to weld the blades 104 to the shaft 102, the six TIG-welding torches and an active, circulating-water cooling system (not shown) to cool the die during welding are simultaneously activated as the six lengths of blade stock material 502 and the shaft 102 are advanced through the fabrication die. The advancing of the blade stock material 502 and the shaft 102 may be motorized or otherwise automated, or may alternatively be achieved manually. As the shaft 102 and the six lengths of blade stock material 502 are advanced through the die, the blade channels of the fabrication die cause the six lengths of blade stock material 502 to advance along their desired helical paths along the outer surface 106, while the six TIG-welding torches simultaneously weld the blade stock material lengths to the outer surface 106 of the shaft 102 along those desired helical paths, by delivering sufficient heat energy to melt both the outer surface 106 and the blade stock material 502 at their point of contact with each other, thereby autogenously welding the blade stock material 502 to the shaft 102 along the desired helical paths. The shaft and six lengths of blade stock continue to be fed through the fabrication die until all six of the helical blades 104 have been formed and continuously autogenously welded to the central shaft 102 along their desired helical paths.

Advantageously, because the welding of the present embodiment involves simultaneous welding by six TIG-welding torches (or more generally a plurality of welding torches) disposed at equal angular positions about the central axis 103 of the shaft 102, the shaft 102 is heated in an approximately symmetrical manner from all sides at any given time, which tends to significantly reduce the likelihood that the welding process may undesirably warp the shaft 102. Thus, the symmetrical heating of the present embodiment tends to overcome the traditional perceived obstacle to direct welding of the blades to the shaft, namely, the fear that conventional fabrication methods would result in differential heating on one side of the shaft at a time causing the shaft to warp, a fear that was premised on an assumption that the blades would be sequentially attached to the shaft rather than the simultaneous attachment of the present embodiment.

Thus, the novel fabrication process described above advantageously provides the reel 100 with a rotationally balanced mass distribution. The rotationally balanced mass distribution of the present embodiment does not result from a perfectly homogeneous shaft 102, but rather, from the rotational symmetry about the central axis 103 of any inhomogeneities that may arise. More particularly, in this embodiment the rotationally balanced mass distribution of the reel 100 includes a plurality of inhomogeneities symmetrically distributed about the central axis 103 of the central shaft 102, the plurality of inhomogeneities having been formed by the above-noted simultaneous welding of all of the plurality of blades 104 directly to the central shaft 102. More particularly still, in this embodiment the plurality of inhomogeneities includes a plurality of welds symmetrically distributed about the central axis 103 of the central shaft 102, formed by the above-noted simultaneous welding of all of the plurality of blades 104 directly to the central shaft 102.

In this embodiment, in which the helical blades 104 have been continuously autogenously welded directly to the central shaft 102, each of the welds extends continuously along a respective one of the helical paths of the helical blades 104, such as the helical path 108 of the first helical blade 110, on the outer surface 106 of the central shaft 102. Each of the welds of the present embodiment includes a region of the outer surface 106 of the central shaft 102 in which material of the shaft has been autogenously melted together with material of one of the helical blades 104. Thus, in this embodiment the central shaft 102 has six such inhomogeneities comprising the six respective welds extending along the six respective helical paths of the six helical blades 104. However, in this embodiment the inhomogeneities result from simultaneous welding at rotationally symmetrical angular positions about the central shaft 102, corresponding to the angular positions within the fabrication die of the six TIG-welding torches. Thus, to the extent that each weld may represent localized density and/or composition differentials at its circumferential position relative to the surrounding material of the shaft immediately adjacent the weld, the even and symmetrical angular distribution of the welds about the central axis 103 ensures that any localized inhomogeneities along the welds negate each other during operation and do not result in a rotational imbalance of the central shaft 102.

In contrast, it would not have been possible to continuously weld the blades directly to the shaft of a cutting reel using conventional fabrication techniques that involve attaching the blades to the shaft sequentially rather than simultaneously. If it were attempted to continuously autogenously weld only a single one of the helical blades 104 directly to the shaft 102, such as welding only the first helical blade 110 without the other five blades 104, such welding would result in a large temperature differential between the helical path 108 along which the blade 110 is being welded and the adjacent portions of the shaft. Unlike the situation that would arise with the innovative fabrication method above, this large temperature increase on one side of the shaft 102 would not be balanced by other equally large temperature increases at other symmetrically distributed locations around the axis 103, and would therefore result in a significant thermal expansion of the outer surface 106 of the central shaft 102 on the side on which the blade is being welded to the helical path 108, relative to other cooler regions of the outer surface 106 including the opposite side from the helical path 108, thereby causing the outer surface 106 to warp and deform. After welding even a single blade to the shaft 102, the shaft would be too deformed for proper cutting reel operation.

Attempting to weld additional blades sequentially to the deformed shaft would typically aggravate rather than mitigate the initial deformation, because the subsequent welding process would be occurring over a shaft that now has a different shape than its initial cylindrical shape.

Referring to FIGS. 3 and 5, in this embodiment, once the six helical blades 104 have been continuously autogenously welded to the shaft along their entire respective helical paths, the radially outer surface region 302 of the first helical blade 110 is ground to form the leading outer surface 304, and the radially outer regions of the other helical blades 104 are similarly ground. More particularly, in this embodiment such grinding is achieved by driving a relatively high-speed rotation (e.g. 1750 rpm) of the cutting reel 100 to cause a radially distal surface 504 of the blade stock material to grind against a grinding surface (not shown), to grind down a portion of a radially distal tip 506 of the blade stock material 502. The resulting grinding forms the leading outer surface 304 of the first helical blade 110 and the similar leading outer surfaces of the other helical blades 104, each of the leading outer surfaces lying on the surface of the same virtual cylinder surrounding the axis 103. Since the circumferential angular extent of each leading outer surface 304 is small compared to the circumference of the virtual cylinder on which they lie, each leading outer surface forms an approximately planar shape, normal to a virtual radial line extending radially outward from the central axis 103.

In this embodiment, the central shaft 102 and the plurality of helical blades 104 are nitrided. More particularly, in the present embodiment, after the leading outer surfaces of the six helical blades 104 have been formed, the helical-bladed cutting reel 100 is salt-bath nitrided, to diffuse nitrogen into the surfaces of the helical blades 104 and of the shaft 102, to create case-hardened outer surfaces of the blades and of the shaft.

ALTERNATIVES

Figure 6:
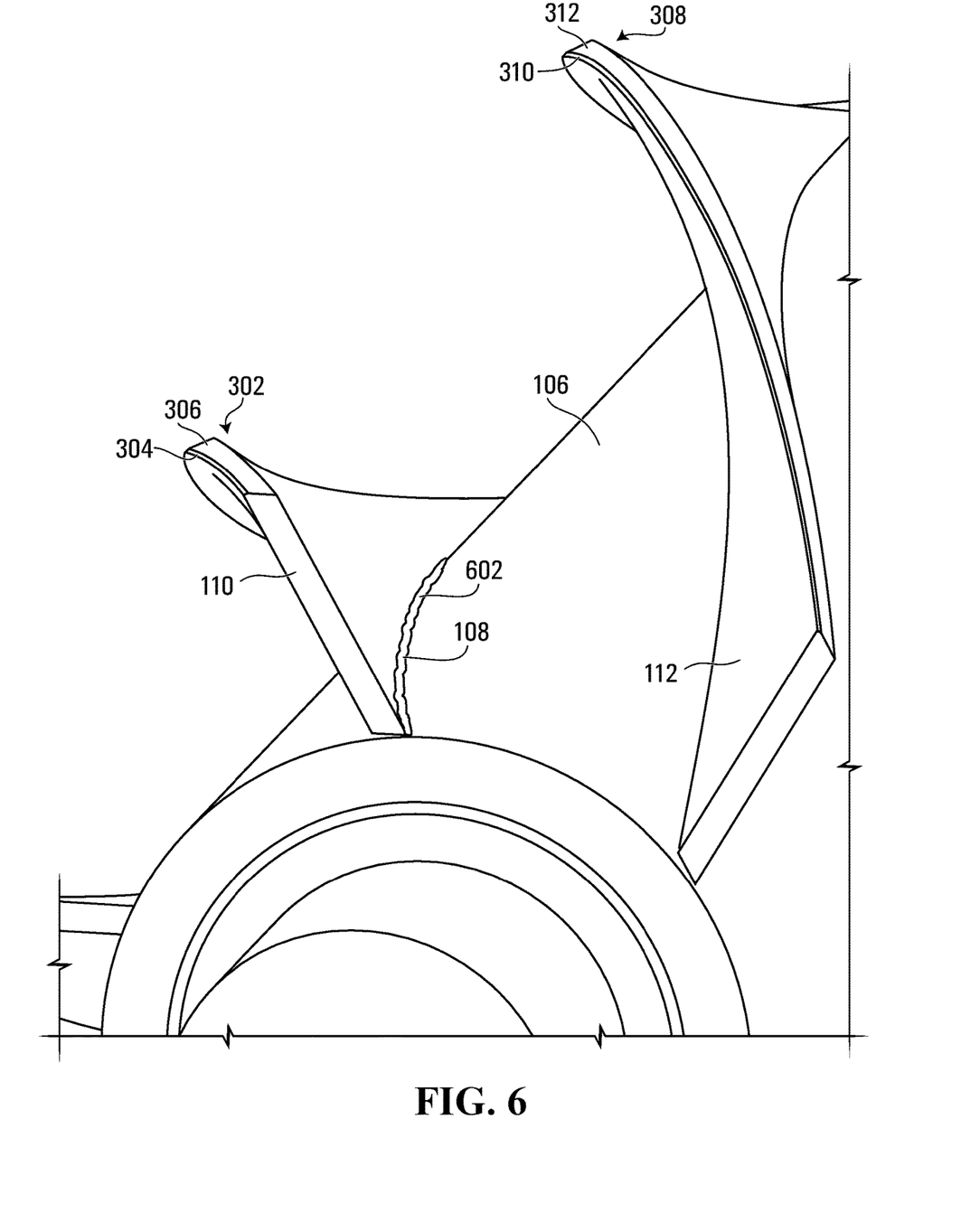
FIG. 6 is an inclined right-rear-top detail view of a right (trailing) end of a helical-bladed cutting reel according to an alternative embodiment.

Referring to FIGS. 1, 3 and 6, although the embodiment described above involved each of the helical blades 104 being autogenously welded to the outer surface 106 of the shaft, alternatively each of the helical blades 104 may instead be welded directly to the central shaft 102 using a filler material. Thus, referring to FIG. 6, in an alternative embodiment, the first helical path 108 includes a welded helical path along which the first helical blade 110 is continuously welded to the outer surface 106 of the shaft 102 using an appropriate filler material 602. For example, the helical blades 104 may be continuously welded to the shaft 102 by Metal-Inert-Gas (MIG) welding, using a consumable wire electrode of the MIG-welder as the filler material 602. Thus, in embodiments that are welded with a filler material, each of the welds (discussed above in connection with the rotationally symmetrical inhomogeneities of the reel) may include a region of the outer surface 106 of the central shaft 102 in which material of the central shaft has been welded with the filler material. In continuously welded embodiments each such region may be co-extensive with a respective one of the helical paths of the helical blades 104. Since the helical paths are symmetrically distributed about the central axis 103, the welds are also symmetrically distributed about the central axis, and therefore negate each other's effects and do not result in a rotational imbalance of the shaft 102. Alternatively, as noted above, in other embodiments the welds using filler material may include spot welds.

Figure 7:
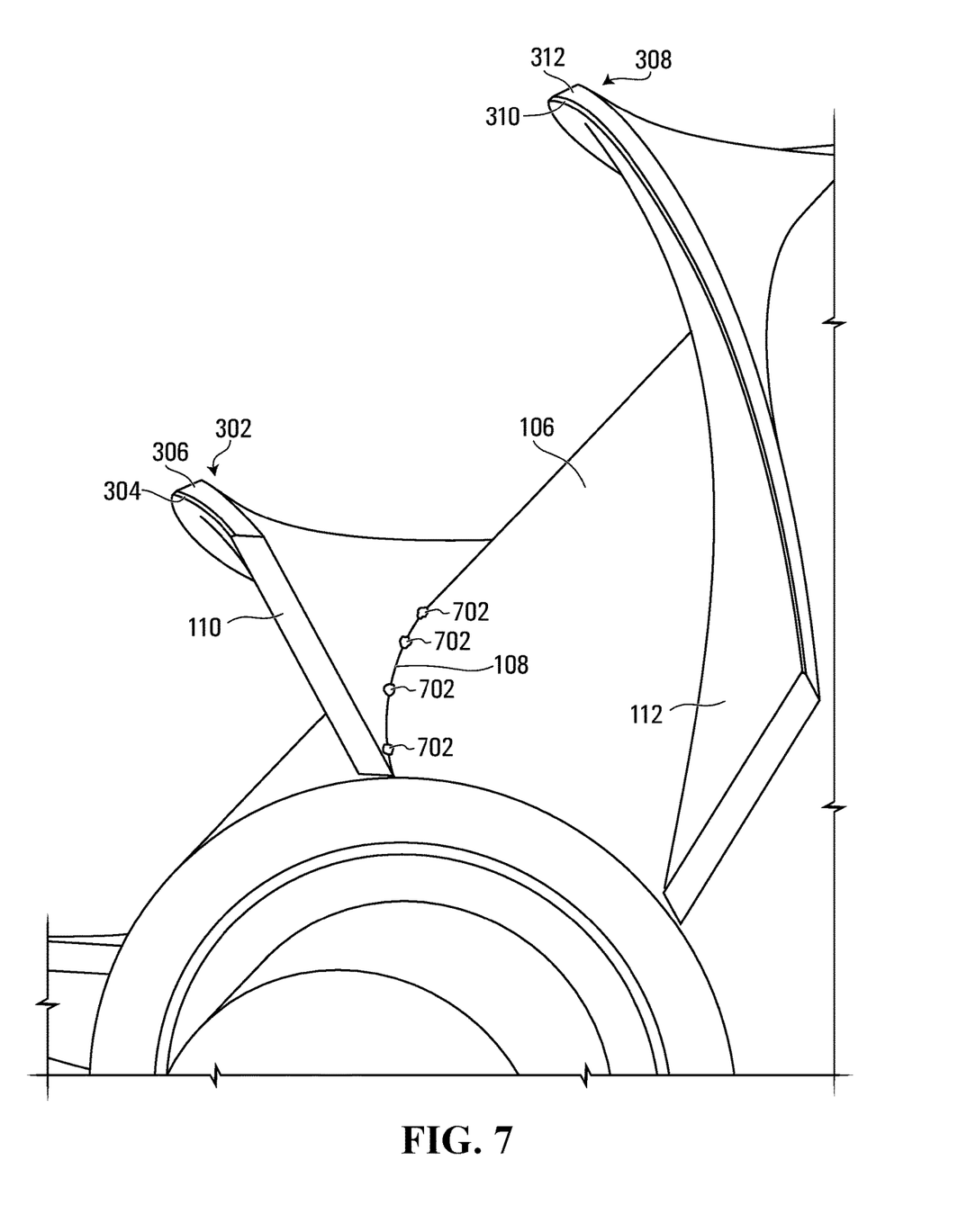
FIG. 7 is an inclined right-rear-top detail view of a right (trailing) end of a helical-bladed cutting reel according to another alternative embodiment.

Referring to FIGS. 1, 3 and 7, although the embodiments described above involved each of the helical blades 104 being continuously welded to the outer surface 106 of the shaft 102, alternatively each of the helical blades 104 may be spot welded directly to the central shaft 102 instead. Thus, referring to FIG. 7, in an alternative embodiment, the first helical path 108 includes a spot-welded helical path along which the first helical blade 110 is welded to the outer surface 106 of the shaft 102 at a plurality of spots such as those shown at 702, at spaced apart intervals along the entire length of the first helical path 108. In some such embodiments, the spots 702 are spot-welds using filler material, such as MIG welds using the consumable wire electrode of the MIG-welder as the filler material. In other such embodiments, the spots 702 are instead autogenous spot-welds; for such embodiments, the fabrication method described above in connection with the embodiment of FIGS. 1-5 may be varied so that the welding torches are simultaneously activated and deactivated intermittently rather than continuously as the blade stock and shaft are advanced through the fabrication die, to achieve intermittent (spot) autogenous welding. Advantageously, since all of the welding torches are simultaneously activated for each axially spaced spot-weld location, any inhomogeneities resulting from the spot-welds are again symmetrically distributed around the axis 103 so that their effects negate each other and do not result in a net rotational imbalance of the shaft 102. In such embodiments, the plurality of inhomogeneities includes a plurality of welds, which in turn includes a plurality of groups of welds, each group corresponding to a respective one of the plurality of blades 104, each group including a plurality of discrete welds at spaced apart intervals along a corresponding one of the helical paths on the outer surface 106 of the shaft 102, each discrete weld having been formed by spot-welding the respective blade 104 to the shaft 102. Each one of these welds is symmetrically distributed with corresponding welds of the other groups at the same axial position along a length of the central shaft.

In other embodiments, the number of helical blades 104 may vary. Likewise, the number of turns around the central axis 103 that each blade 104 completes across the length of the shaft 102 may also vary. Conventional fabrication techniques typically require the blades to be pre-formed into helical shape before they are attached to the shaft, and are typically limited to no more than about three-quarters of one turn around the central axis 103 for each of the blades. In contrast, the fabrication method described above is unhindered by the conventional need to pre-shape the blades into helixes, and is amenable to much more tightly wound helical blade shapes than were traditionally achievable, including more tightly wound shapes than the 1.5-turn helical blades 104 of the main embodiment described above. For tighter helixes (more turns per unit length), the fabrication die of the embodiment described above may be replaced with one whose blade channels divert the blades further away from the axial direction as they advance through the die, resulting in a helical path whose circumferential component is a proportionally greater fraction of its axial component at any given point. Conversely, for looser helixes (fewer turns per unit length), the fabrication die may be replaced with one whose blade channels do not divert the blades as far from the axial direction as they advance through the die, thereby resulting in a helical path whose circumferential component is a proportionally smaller fraction of its axial component.

The radial angling of the blades may also vary, if desired. For example, in some such embodiments the radial offset of the blade angle is omitted and each helical blade 104 points radially away from the shaft 102, within any cross-section normal to the axis 103 of the shaft.

Referring back to FIG. 3, in alternative embodiments, the trailing outer surface 306 may have a steeper or shallower radially inward inclination relative to the leading outer surface 304. In some such embodiments, the inclination is zero: effectively, in the latter embodiments, the radially outer region 302 is not divided into separate leading and trailing outer surfaces 304 and 306 at all, but rather consists of a single approximately planar (technically arcuate) surface that corresponds to the orientation of the leading outer surface 304, normal to a virtual radius line extending radially outward from the shaft 102, but extended across the thickness of the blade.

In some embodiments, the innovative helical-bladed cutting reels described herein may be fabricated by methods other than the innovative method described herein.

In some embodiments, the innovative method described herein may be used to fabricate helical-bladed cutting reels other than those described herein.

In addition to the embodiments described above, it is contemplated that any one or more features of any particular embodiment may be combined with any one or more features of any other embodiment, except where such features have been described as mutually exclusive alternatives.

More generally, while specific embodiments of the invention have been described and illustrated, such embodiments should be considered illustrative of the invention only and not as limiting the invention as defined by the accompanying claims.

What is claimed is:

1. A helical-bladed cutting reel comprising:
a central shaft including a central axis of rotation; and
a plurality of helical blades;
wherein each of the blades extends along a respective helical path on an outer surface of the central shaft, wherein a direction of each respective helical path has both an axial component and a circumferential component relative to the central axis of the central shaft as it extends across the outer surface of the central shaft; and
wherein each of the helical blades is welded directly to the central shaft.

2. The helical-bladed cutting reel of claim 1 wherein each of the helical blades is continuously welded directly to the central shaft.

3. The helical-bladed cutting reel of claim 1 wherein each of the helical blades is autogenously welded directly to the central shaft.

4. The helical-bladed cutting reel of claim 1 wherein each of the helical blades is continuously autogenously welded directly to the central shaft.

5. The helical-bladed cutting reel of claim 1 wherein the reel has a rotationally balanced mass distribution comprising a plurality of welds symmetrically distributed about the central axis of the central shaft, the plurality of welds having been formed by simultaneous welding of all of the plurality of blades directly to the central shaft.

6. The helical-bladed cutting reel of claim 5 wherein each of the welds comprises a region in which material of the central shaft has been autogenously melted together with material of one of the helical blades.

7. The helical-bladed cutting reel of claim 1, further comprising an anti-dive mechanism configured to engage with a flexible cutting knife to prevent the knife from diving into a path of a leading edge of each of the blades as the reel spins.

8. The helical-bladed cutting reel of claim 7, wherein the anti-dive mechanism comprises a disc extending radially outward from the central shaft at a leading end of the shaft at which each of the plurality of helical blades first engages with the flexible cutting knife as the reel spins.

9. The helical-bladed cutting reel of claim 1, wherein the plurality of helical blades comprises two to fifteen helical blades.

10. The helical-bladed cutting reel of claim 1, wherein the plurality of helical blades comprises six helical blades.

11. The helical-bladed cutting reel of claim 1, wherein each of the respective helical paths extends for at least one revolution about the central axis of the central shaft over the axial length of the central shaft.

12. The helical-bladed cutting reel of claim 1 wherein each of the helical blades comprises high-carbon steel.

13. The helical-bladed cutting reel of claim 1 wherein the central shaft and the plurality of helical blades are nitrided.

14. The helical-bladed cutting reel of claim 1 wherein a radially outer surface region of each of the helical blades comprises a leading outer surface and a trailing outer surface, wherein the leading outer surface is normal to a radius of the central shaft, and wherein the trailing outer surface inclines twenty degrees radially inward relative to the leading outer surface as it extends away from the leading outer surface.

15. The helical-bladed cutting reel of claim 1 wherein each of the helical blades is spot-welded directly to the central shaft.

16. The helical-bladed cutting reel of claim 1 wherein each of the helical blades is welded directly to the central shaft using a filler material.

17. The helical-bladed cutting reel of claim 5 wherein the plurality of welds comprises a plurality of groups of welds, each group corresponding to a respective blade of the plurality of blades, each group comprising a plurality of discrete welds at spaced apart intervals along a corresponding one of the helical paths on the outer surface of the shaft, each discrete weld having been formed by spot-welding the respective blade to the shaft, wherein each one of the welds is symmetrically distributed with corresponding welds of the other groups at the same axial position along a length of the central shaft.

18. The helical-bladed cutting reel of claim 1 wherein the central shaft is solid.

19. The helical-bladed cutting reel of claim 1 wherein the central shaft comprises a shaft fabricated by lathing.

* * * * *